(12) United States Patent
Grover et al.

(10) Patent No.: US 11,787,569 B2
(45) Date of Patent: Oct. 17, 2023

(54) SYSTEM AND METHOD FOR OPTIMIZING A LOW-THRUST TRAJECTORY OF A SPACECRAFT TRAJECTORY

(71) Applicant: Mitsubishi Electric Research Laboratories, Inc., Cambridge, MA (US)

(72) Inventors: Piyush Grover, Cambridge, MA (US); Uros Kalabic, Jamaica Plain, MA (US); Avishai Weiss, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 520 days.

(21) Appl. No.: 16/299,300

(22) Filed: Mar. 12, 2019

(65) Prior Publication Data
US 2020/0055617 A1 Feb. 20, 2020

Related U.S. Application Data

(60) Provisional application No. 62/719,311, filed on Aug. 17, 2018.

(51) Int. Cl.
*B64G 1/00* (2006.01)
*B64G 1/24* (2006.01)
(Continued)

(52) U.S. Cl.
CPC ............ *B64G 1/007* (2013.01); *B64G 1/242* (2013.01); *G06F 17/13* (2013.01); *B64G 1/283* (2013.01); *B64G 1/363* (2013.01)

(58) Field of Classification Search
CPC ........ B64G 1/007; B64G 1/242; G01C 21/02; G01C 21/24
See application file for complete search history.

(56) References Cited

U.S. PATENT DOCUMENTS

| | | | |
|---|---|---|---|
| 6,845,950 B1 * | 1/2005 | Goodzeit | B64G 1/007 244/158.6 |
| 10,532,829 B2 * | 1/2020 | Amalric | B64G 1/244 |

(Continued)

OTHER PUBLICATIONS

Sreesawet et al.; Fast and Robust Computation of Low-Thrust Orbit-Raising Trajectories; Journal of Guidance, Control, and Dynamics; Apr. 24, 2018; 41:9, 1888-1905. (Year: 2018).*

(Continued)

*Primary Examiner* — Richard Green
*Assistant Examiner* — Michael A. Fabula
(74) *Attorney, Agent, or Firm* — Gennadiy Vinokur; Hironori Tsukamoto

(57) ABSTRACT

A system for optimizing a low-thrust trajectory of a spacecraft trajectory for orbital transfer includes an interface to receive data, a memory to store scheduled geostationary transfer orbit (GTO) data and scheduled geostationary Earth orbit (GEO) data and computer-executable programs, and a processor. The processor is configured to provide a two-dimensional (2D) averaged trajectory consisting of a predetermined revolutions by executing the optimal control program using the GTO data and GEO data, arrange N equidistant points on the 2D averaged trajectory to form segments on the 2D averaged trajectory, obtain osculating elements corresponding to the segments by solving optimization problems for the segments, estimate initial guesses of the segments under continuous thrusting conditions in tangential directions at the N equidistant points, solve a minimum energy optimization problem to obtain a minimum energy 2D osculating trajectory by using as initial guess the concatenation of segments, compute a minimum energy three-dimensional (3D) osculating trajectory by linearly decreasing an inclination of the minimum energy 2D osculating trajectory to zero, and generating a minimum fuel 3D (Continued)

osculating trajectory by iteratively solving a cost function while changing a parameter from one to zero.

8 Claims, 14 Drawing Sheets

(51) Int. Cl.
*G06F 17/13* (2006.01)
*B64G 1/36* (2006.01)
*B64G 1/28* (2006.01)

(56) References Cited

U.S. PATENT DOCUMENTS

| | | | | |
|---|---|---|---|---|
| 2013/0187008 A1* | 7/2013 | Grover | ............... | B64G 1/242 |
| | | | | 244/158.5 |
| 2014/0032018 A1* | 1/2014 | Grover | ............... | B64G 1/242 |
| | | | | 701/3 |
| 2014/0214373 A1* | 7/2014 | Jardin | ............... | G06F 17/13 |
| | | | | 703/2 |
| 2017/0297746 A1* | 10/2017 | Amalric | ............ | B64G 1/405 |

OTHER PUBLICATIONS

Graham et al.; Minimum-Time Trajectory Optimization of Low-Thrust Earth-Orbit Transfers with Eclipsing; Journal of Spacecraft and Rockets; 2016; vol. 53, No. 2, pp. 289-303. (Year: 2016).*

Dutta et al.; Minimum-Fuel Electric Orbit-Raising of Telecommunication Satellites Subject to Time and Radiation Damage Constraints; 2014 American Control Conference; 2014; pp. 2942-2947, doi: 10.1109/ACC.2014.6859179. (Year: 2014).*

Dong Eui Chang, David F. Chichka, Jerrold E. Marsden. Lyapunov-based transfer between elliptic Keplerian orbits. Discrete & Continuous Dynamical Systems—B,2002, 2 (1) : 57-67. doi: 10.3934/dcdsb.2002.2.57. (Year: 2002).*

Kalabic et al.; Low-thrust GTO-to-GEO trajectory optimization and tracking; Mitsubishi Electric Research Laboratories ; Aug. 24, 2018; TR2018-117. (Year: 2018).*

Seungwon Lee, P. von Ailmen, W. Fink, A. F. Petropoulos and R. J. Terrile, "Design and optimization of low-thrust orbit transfers," 2005 IEEE Aerospace Conference, Big Sky, MT, USA, 2005, pp. 855-869, doi: 10.1109/AERO.2005.1559377. (Year: 2005).*

* cited by examiner

SYSTEM AND METHOD FOR OPTIMIZING A LOW-THRUST TRAJECTORY OF A SPACECRAFT TRAJECTORY

CROSS-REFERENCE TO RELATED APPLICATION

This application claims the benefit of U.S. Provisional Patent Application No. 62/719,311, filed Aug. 17, 2018, which is incorporated by reference herein in its entirety.

TECHNICAL FIELD

This invention relates generally to a satellite guidance and control system, and more specifically to a low-thrust trajectory generation and tracking system.

BACKGROUND

Communication satellites are inserted into Geostationary orbits (GEO) so that they remain fixed to an observer on Earth. A common way of placing satellites into GEO is by using a combination of few large chemical rocket burns to go from a Geostaionary Transfer Orbit (GTO) to GEO, e.g. the Hohmann or bi-elliptic transfers. Such transfers are only a few orbits long, and the location and number of burns can be easily optimized using standard optimization tools. While such transfers can be carried out in matter of hours, they are not the most fuel efficient way of reaching GTO.

Electric propulsion is a modern alternative to chemical rockets. Electric propulsion uses electricity to change the velocity of a spacecraft. The advantage of electric propulsion thrusters is that they have higher specific impulse, i.e., the propellant is used more effectively to produce thrust than chemical rockets. A limitation of electric propulsion is that the maximum thrust produced is tiny compared to chemical thrusters, and hence, it takes much longer (on order of months) to reach GEO from GTO.

A typical GTO-to-GEO trajectory using electric propulsion consists of 100 s of orbits. This feature makes the problem of optimizing, and tracking such trajectories much more challenging as compared to chemical thruster trajectories.

Numerical optimization of such trajectories is carried out using tools of optimal control theory. The task is to find thruster magnitude and direction at all times, such that either the mission time, or fuel usage is minimized. While the theory of optimal control is mature, the resulting optimization problem for low-thrust trajectories is of very large size, and is highly non-convex.

There are no general tools available for solving large non-convex optimization problems that guarantee that the obtained solution is a global optimal. Moreover, it is quite difficult to get an idea of degree of non-optimality of such solutions obtained from numerical solvers.

Accordingly, there is still a need for a system and method suitable for near-optimal minimum fuel osculating trajectory generation, and tracking for low-thrust spacecrafts.

SUMMARY

Some embodiments of the present invention relate to optimizing the orbit transfer process of a satellite (or spacecraft) from the Geostationary Transfer Orbit to a Geostationary Earth Orbit. The orbit transfer process is generally performed by using electric propulsion. Electric propulsion techniques have higher specific impulse, which enables more effective use of energy. However, the maximum thrust is very less as compared to fuel thrusters. As a result, the orbit transfer process using electric propulsion thrusters takes time in order of months.

Accordingly, some embodiments of the present invention can provide a system and method to obtain a minimum fuel and minimum time trajectory for the orbit transfer process. The solution for the process includes some steps. An offline spacecraft trajectory (optimizing) system computes an initial guess of the trajectory of the satellite for the transfer optimized for minimum fuel and time consumption. In this case, the trajectory data of a spacecraft is obtained from an online satellite operation control system via a network. The initial guess is used to solve a minimum energy optimization problem with respect to 2D and the solution is used to obtain a minimum energy osculating solution in 3D. Further the minimum energy osculating solution in 3D is used to compute a minimum fuel osculating solution in 3D.

Some embodiments are based on recognition that the fuel optimization of several months long low-thrust trajectories for GTO-to-GEO transfers consisting of 100 s of orbits can be effectively performed by a multi-step process. These steps involve combining analytical and numerical strategies, solving a series of smaller optimization problems, and exploiting homotopy method.

According to some embodiments of the present invention, a system for optimizing a low-thrust trajectory of a spacecraft trajectory for orbital transfer include an interface to receive data via a network; a memory to store scheduled geostationary transfer orbit (GTO) data and scheduled geostationary Earth orbit (GEO) data and computer-executable programs including an optimal control program; a processor, in connection with the memory, configured to: provide a two-dimensional (2D) averaged trajectory consisting of a predetermined revolutions by executing the optimal control program using the GTO data and GEO data; arrange N equidistant points on the 2D averaged trajectory to form segments on the 2D averaged trajectory; obtain osculating elements corresponding to the segments by solving optimization problems for the segments, wherein each of the optimization problems is solved by minimizing a distance between an end-point of a current segment and a next point of a next segment on the 2D averaged trajectory; estimate initial guesses of the segments under continuous thrusting conditions in tangential directions at the N equidistant points; solve a minimum energy optimization problem to obtain a minimum energy 2D osculating trajectory by using as initial guess the concatenation of segments; compute a minimum energy three-dimensional (3D) osculating trajectory by linearly decreasing an inclination of the minimum energy 2D osculating trajectory to zero; and obtain a minimum fuel 3D osculating trajectory by iteratively solving a cost function while changing a parameter from one to zero.

According to embodiments, analytical solutions of averaged minimum energy problem can be computed using averaging methods in the planar case.

Further, some embodiments are based on recognition that a good initial guess for numerically computing an osculating solution to planar minimum energy problem can be obtained by splitting the averaged trajectory into segments one orbit long, and solving a series of smaller optimal control problem. In this case, the initial condition of each segment is on the averaged trajectory, and the cost function measures the difference between end-point of the computed segment, and next point on the averaged trajectory. The various segments are then combined into an initial guess for the full osculating 2D minimum energy trajectory, and the corresponding optimal control problem is solved.

Some embodiments are based on recognition that 2D osculating trajectories with linearly decreasing inclination provide a good initial guess for finding 3D osculating minimum energy trajectories. This guess is used to solve for 3D osculating minimum energy trajectory.

According to some embodiments of the present invention, a method for optimizing a low-thrust trajectory of a spacecraft trajectory for orbital transfer includes receiving data via a network using an interface; providing, using a processor, a two-dimensional (2D) averaged trajectory consisting of a predetermined revolutions by executing the optimal control program using scheduled geostationary transfer orbit (GTO) data and scheduled geostationary Earth orbit GEO data stored in a memory; arranging N equidistant points on the 2D averaged trajectory to form segments on the 2D averaged trajectory; obtaining osculating elements corresponding to the segments by solving optimization problems for the segments, wherein each of the optimization problems is solved by minimizing a distance between an end-point of a current segment and a next point of a next segment on the 2D averaged trajectory; estimating initial guesses of the segments under continuous thrusting conditions in tangential directions at the N equidistant points; using the minimum energy 2D averaged trajectory to solve for a minimum energy 2D osculating trajectory by applying the initial guesses to the segments; computing a minimum energy three-dimensional (3D) osculating trajectory by starting with a trajectory obtained by linearly decreasing the inclination of the minimum energy 2D osculating trajectory from that GTO to zero; and generating a minimum fuel 3D osculating trajectory by iteratively solving a cost function while changing a parameter from one to zero.

Some embodiments are based on recognition that a good initial guess for 3D osculating minimum fuel trajectory can be obtained by performing a homotopy operation, beginning with the 3D osculating minimum energy trajectory, and solving another series of optimal control problems with changing cost functions.

By gradually changing the homotopy parameter from 1 to 0 in the cost function, each successive optimal control problem yields a trajectory that is closer to minimum fuel trajectory than the previous one.

Some embodiments are based on the realization that the value of thrust vector at any instance of time, a unique spacecraft orientation matrix can be obtained by constraining the solar-panel axis to be aligned to be perpendicular to the vector pointing from spacecraft to the sun.

Some embodiments are based on the realization that real-time tracking of the optimal control trajectories computed offline can be done by tracking the unique time-varying spacecraft orientation matrix.

According to some embodiments, an attitude controller that rejects disturbances and ensures close tracking by actuating the reaction wheels on the spacecraft can be constructed by using a Lyapunov function.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
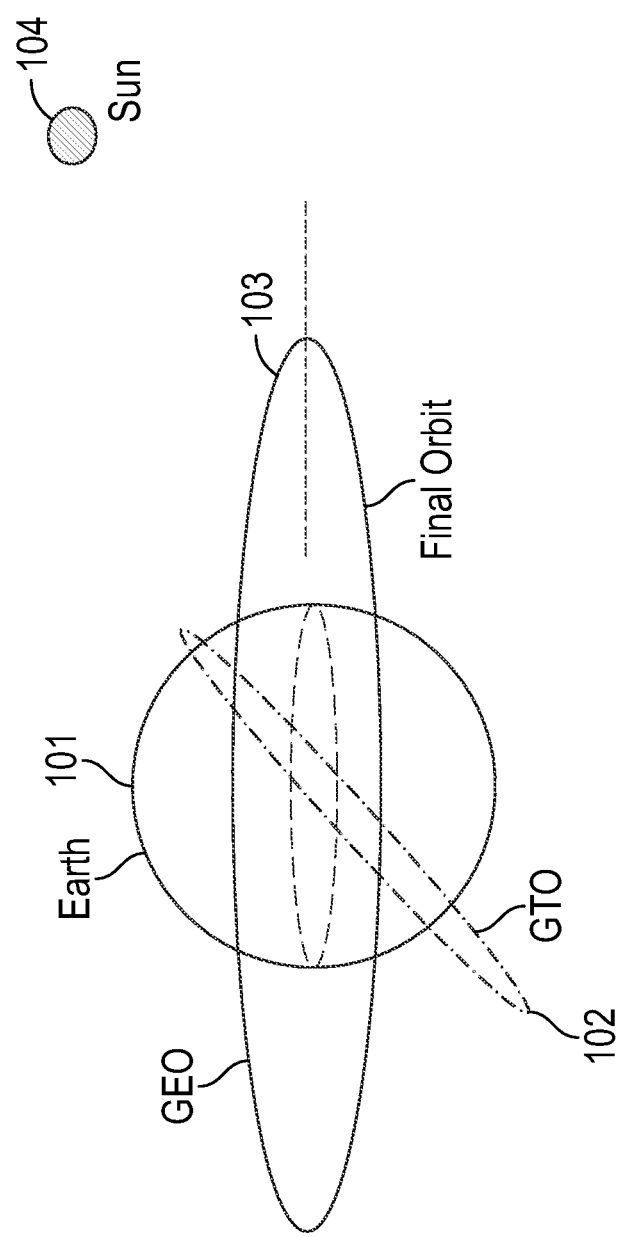
FIG. 1 shows an initial GTO orbit of a satellite and the final desired GEO orbit, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 shows a schematic of the Earth 101, the Sun 104, the starting orbit called the Geostationary transfer orbit (GTO) 102, and the desired final orbit called the Geostationary orbit (GEO) 103.

Figure 2:
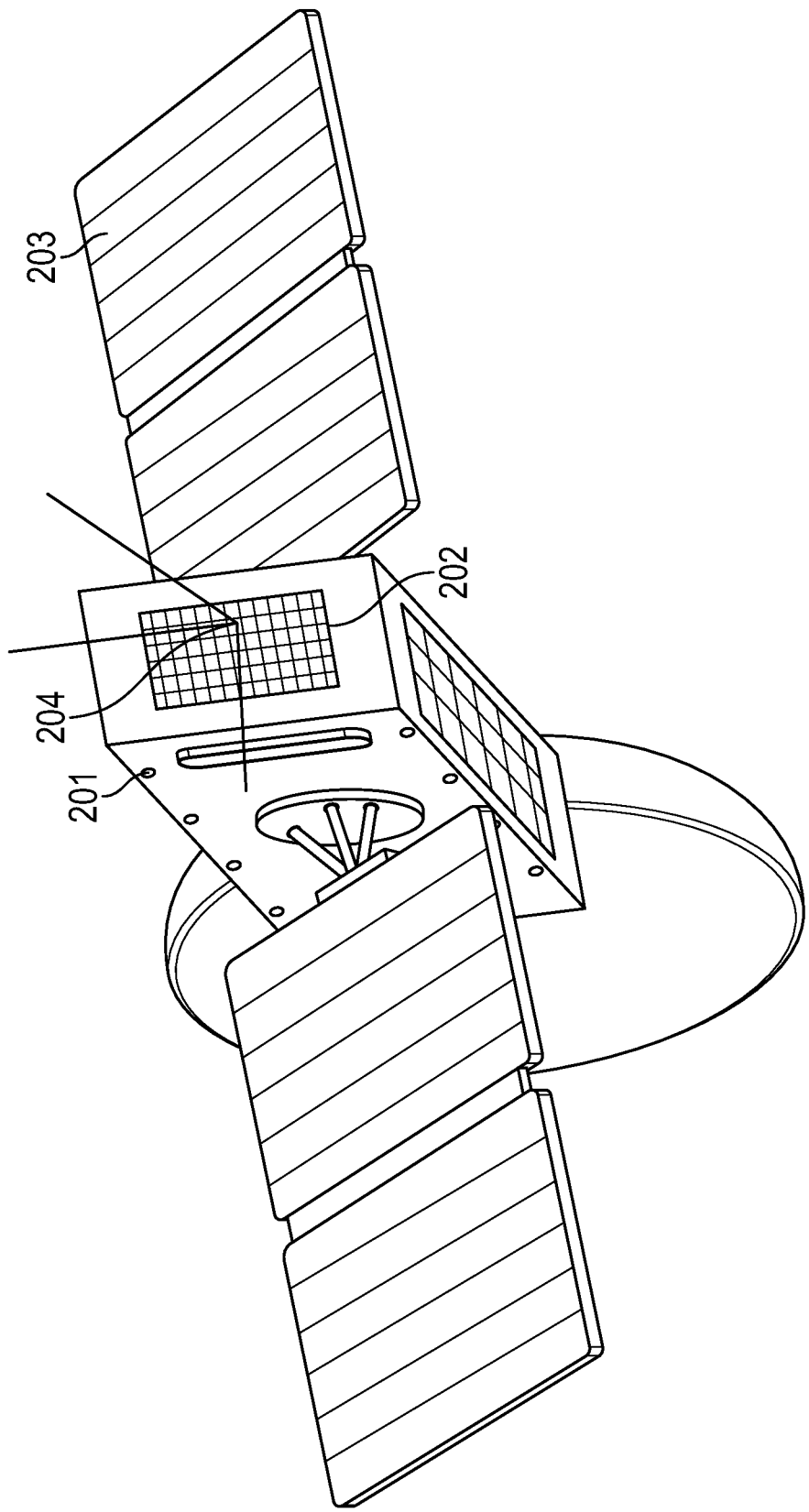
FIG. 2 shows an example illustrating an appearance of a satellite, according to embodiments of the present invention.

FIG. 2 shows an example of a satellite 201 with electric ion propulsion 202 and a solar panel 203. The solar panels convert Sun's energy into electricity. The electric ion propulsion ejects ions, imparting momentum to the spacecraft as a result. The orientation of the spacecraft can be described by the inertial frame values of the three axis 204 fixed in body frame of the spacecraft. The total thrust provided by the ions is very small compared to that provided by a conventional chemical rocket thruster.

Some embodiments are based on recognition that the low thrust trajectories are several months long for GTO-to-GEO transfers with 100 s of orbits. Hence, it is important to design fuel-efficient trajectories, and track the spacecraft in real-time using feedback control to avoid drifting away from the planned optimal trajectories. At the same time, it is crucial to point the solar panels towards the sun, as well as satisfy constraints on reaction wheel speeds.

Figure 3A:
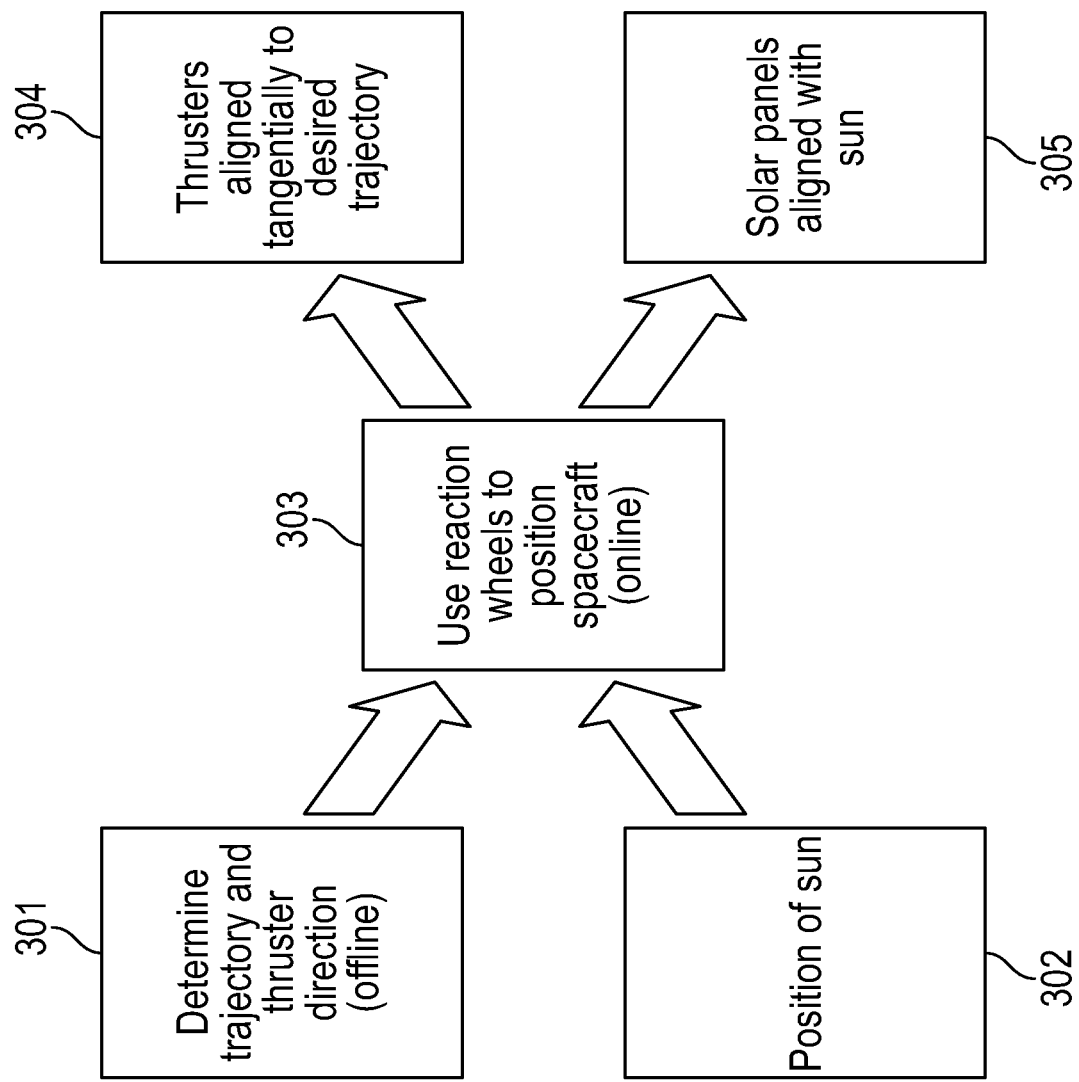
FIG. 3A shows an illustration indicating the overall trajectory generation and tracking plan, according to embodiments of the present invention.

FIG. 3A shows the overall plan for performing these tasks. The fuel-optimal trajectory generation 301 is done offline. In the online phase, this trajectory as well as location of the sun 302 are passed onto a real-time feedback attitude controller 303. This controller commands the reaction wheels to orient the spacecraft to provide thrust along the direction 304 prescribed by the fuel-optimal trajectory, and at the same time, allow the solar panels to point 305 towards the sun.

Figure 3B:
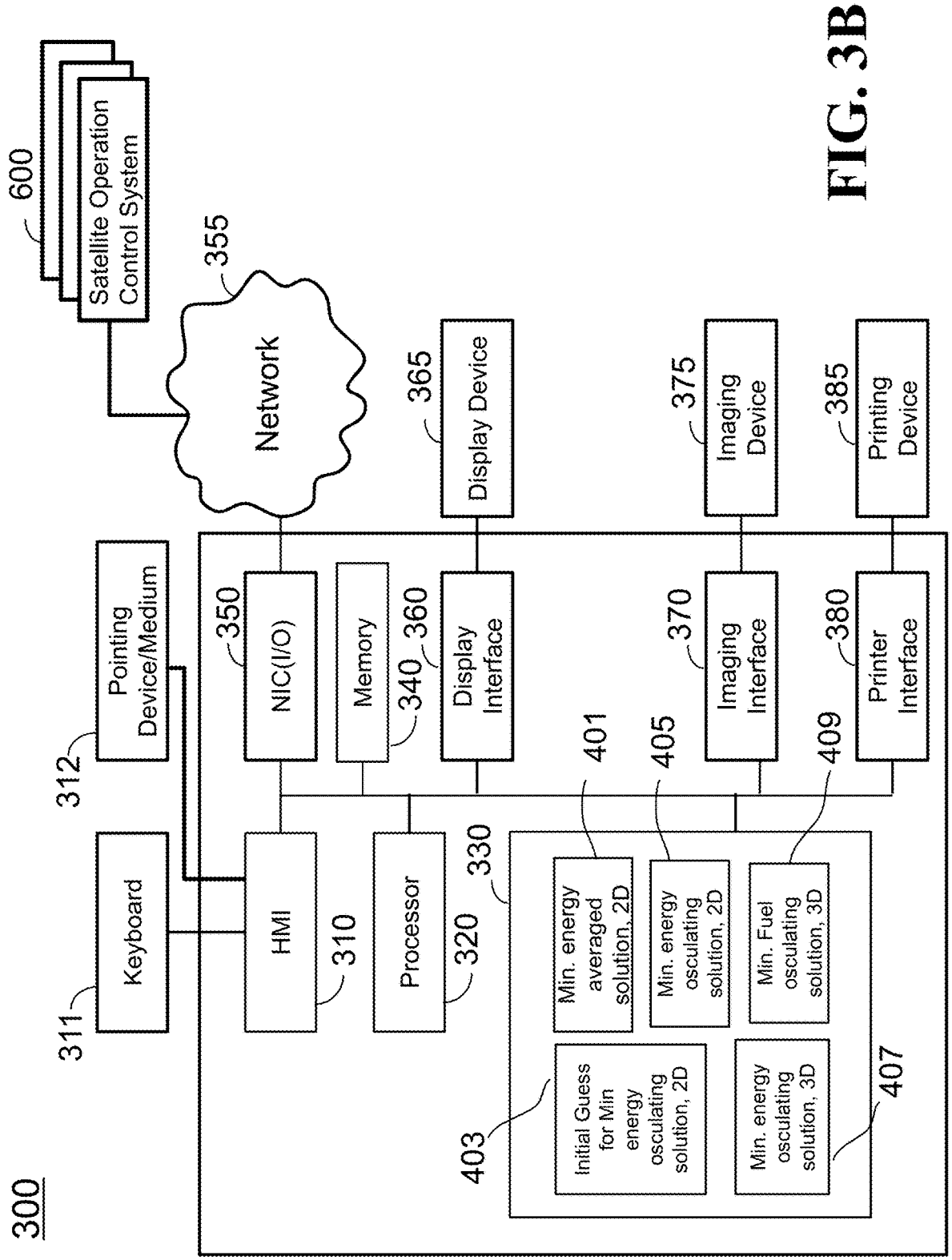
FIG. 3B shows an example illustrating an offline spacecraft trajectory system connected to an online satellite operation control system controlling a satellite, according to embodiments of the present invention.

FIG. 3B shows an example of a block diagram illustrating an offline spacecraft trajectory optimizing system 300 connected to an online satellite operation control system (not shown) for controlling a satellite, according to embodiments of the present invention. In some cases, the offline spacecraft trajectory optimizing system 300 may be referred to as a spacecraft trajectory system 300 in the present disclosure. Further, a satellite may be referred to a spacecraft or vice versa.

The spacecraft trajectory system 300 can include a human machine interface (HMI) with input/output (I/O) interface 310 connectable with a keyboard 311 and a pointing device/medium 312, a microphone, a receiver, a transmitter, and a global positioning system (GPS), where the microphone, the receiver, the transmitter and the GPS are not shown in the figure.

The spacecraft trajectory system 300 may also include a processor 320, a storage device 330, a memory 340 working with the storage device 330, a network interface controller 350 (NIC) connectable with a network 355 including local area networks and internet network (not shown), a display interface 360 connected to a display device 365, an imaging interface 370 connectable with an imaging device 375, a printer interface 380 connectable with a printing device 385. The HMI with I/O interface 310 may include analog/digital and digital/analog converters, which are connected to the receiver and transmitter to communicate with network devices (not shown) outside the system 300. The HMI with I/O interface 310 includes a wireless communication interface that can communicate with an online satellite operation control system 600 or other control systems (not shown) via wireless internet connections or wireless local area networks. The spacecraft trajectory system 300 can include a power source (not shown). The power source may be a battery rechargeable from an external power source (not shown) via the I/O interface included in the system 300. Depending upon the application the power source may be optionally located outside of the system 300.

The HMI and I/O interface 310 and the I/O interfaces can be adapted to connect to another display device (not shown) including a computer monitor, camera, television, projector, or mobile device, among others. The system 300 can receive signals from the online satellite operation control system 600 via the network 355. The storage device 330 includes a minimum energy averaged solution program 401, an initial guess (estimation) program 403 for a minimum energy osculating solution problem in two dimension (2D), a minimum energy osculating solution (in 2D) program 405, a minimum energy osculating solution (in three dimensions: 3D) program 407 and a minimum fuel osculating solution (in 3D) program 409. In this case, the algorithms of the programs 401, 403, 405, 407 and 409 are stored into the storage 330 as code data. The algorithms of the programs 401, 403, 405, 407 and 409 may be stored to a computer readable recording medium (not shown) so that the processor 320 can execute the programs by loading the algorithms from the medium.

Further, the pointing device/medium 312 may include modules that read programs stored on a computer readable recording medium. In response to receiving the signals from online satellite operation control system 600 with respect to directions (angles) of a satellite to the Sun or positions or velocities of the satellite, the processor 320 executes the programs 401, 403, 405, 407 and 409 in communication with the storage 330 and the memory 340.

As the programs executed by the system 300 can provide extremely efficient computing processes for solving large non-convex optimization problems \, the present invention can sufficiently reduce central processing unit (CPU or processor) usage, power consumption and/or network bandwidths usages. This can provide the improvement of the functions of the processor (CPU). In some cases, the processor 320 may be a plurality of processors including one or more graphics processing units (GPUs).

The spacecraft motion can be described using Newton's law as $$\ddot{x} = -\mu \frac{x}{\|x\|^3} + a \quad (1)$$

Where x is the position vector of the spacecraft in Euclidean inertial coordinates, $\mu$ is the gravitational parameter, and a is the acceleration due to ion thruster.

An alternative way to write this equation is to use equinoctial coordinates, $$y = [p, e_x, e_y, h_x, h_y]$$

Where p is the semi-latus rectum, ($e_x$, $e_y$) are components of the eccentricity vector, and ($h_x$, $h_y$) are components of the inclination vector. The sixth coordinate we use is L, which is the longitude.

The equation of motion can be written as $$\dot{y} = \sum_{i=r,\theta,h} f_i(L,y)u_i,$$

$$\dot{L} = g_0(y) + g_h(L,y)u_h$$

where $u_i$ for i=1,2,3 are thrusts in the body fixed frame, $$f_r = \begin{bmatrix} 0 \\ \sqrt{\frac{p}{\mu}}\sin L \\ -\sqrt{\frac{p}{\mu}}\cos L \\ 0 \\ 0 \end{bmatrix}, f_\theta = \begin{bmatrix} \frac{2p}{q}\sqrt{\frac{p}{\mu}} \\ \sqrt{\frac{p}{\mu}}\frac{1}{q}((q+1)\cos L + e_x) \\ \sqrt{\frac{p}{\mu}}\frac{1}{q}((q+1)\sin L + e_y) \\ 0 \\ 0 \end{bmatrix},$$

$$f_h = \begin{bmatrix} 0 \\ -\sqrt{\frac{p}{\mu}}\frac{e_y}{q}(h_x \sin L - h_y \cos L) \\ \sqrt{\frac{p}{\mu}}\frac{e_x}{q}(h_x \sin L - h_y \cos L) \\ \sqrt{\frac{p}{\mu}}\frac{s^2 \cos L}{2q} \\ \sqrt{\frac{p}{\mu}}\frac{s^2 \sin L}{2q} \end{bmatrix}$$

$$g_0 = \sqrt{\mu p}\left(\frac{q}{p}\right)^2, g_h = \sqrt{\frac{p}{\mu}}(h_x \sin L - h_y \cos L),$$

and $$q = 1 + e_x \cos L + e_y \sin L, r = p/q, \alpha^2 = h_x^2 - h_y^2, \text{ and}$$

$$s^2 = 1 + \sqrt{h_x^2 + h_y^2}$$

Some embodiments are based on recognition that the fuel optimization of several months long low-thrust trajectories for GTO-to-GEO transfers consisting of 100 s of orbits can be effectively performed by a multi-step process. These steps involve combining analytical and numerical strategies, solving a series of smaller optimization problems, and exploiting homotopy method.

Figure 4:
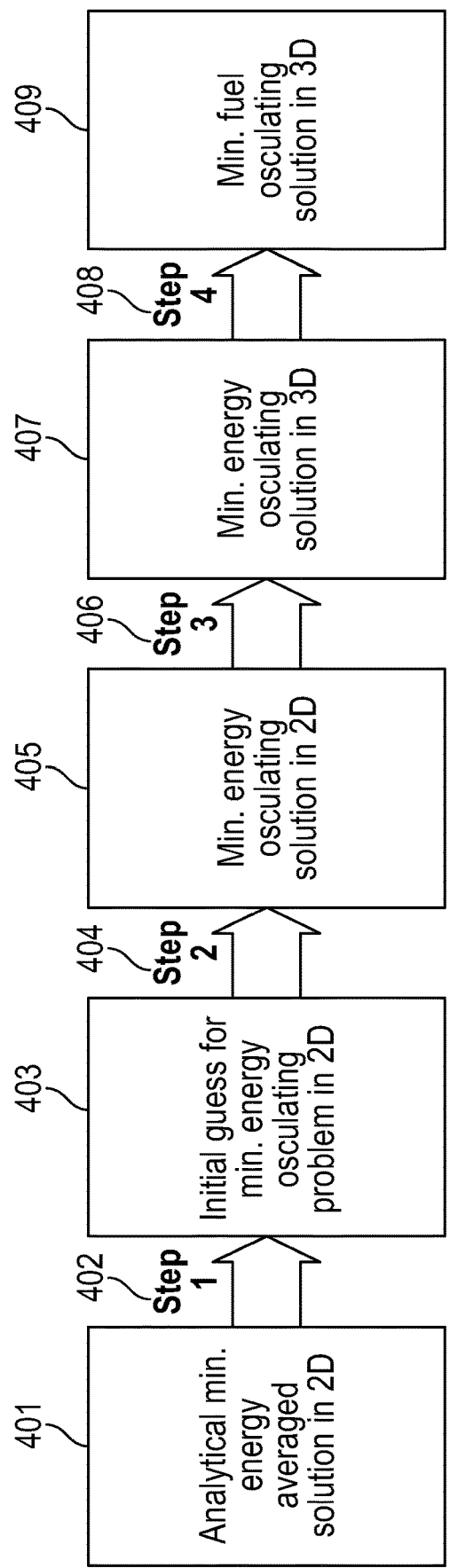
FIG. 4 shows the multi-step algorithm for obtaining minimum fuel trajectory performed in the offline spacecraft trajectory system of FIG. 3B, according to embodiments of the present invention.

FIG. 4 shows the multi-step algorithm for obtaining minimum fuel trajectory performed in the offline spacecraft trajectory system of FIG. 3B, according to embodiments of the present invention, in which the figure describes a multi-step process consisting of 4 steps.

Analytical solutions 401 of an averaged minimum energy problem can be computed using averaging methods in the planar case. However, no such solutions are available for the minimum fuel problem.

Step 1 (402) of multi-step process yields an initial guess 403 for a 2D osculating minimum energy trajectory.

Figure 5:
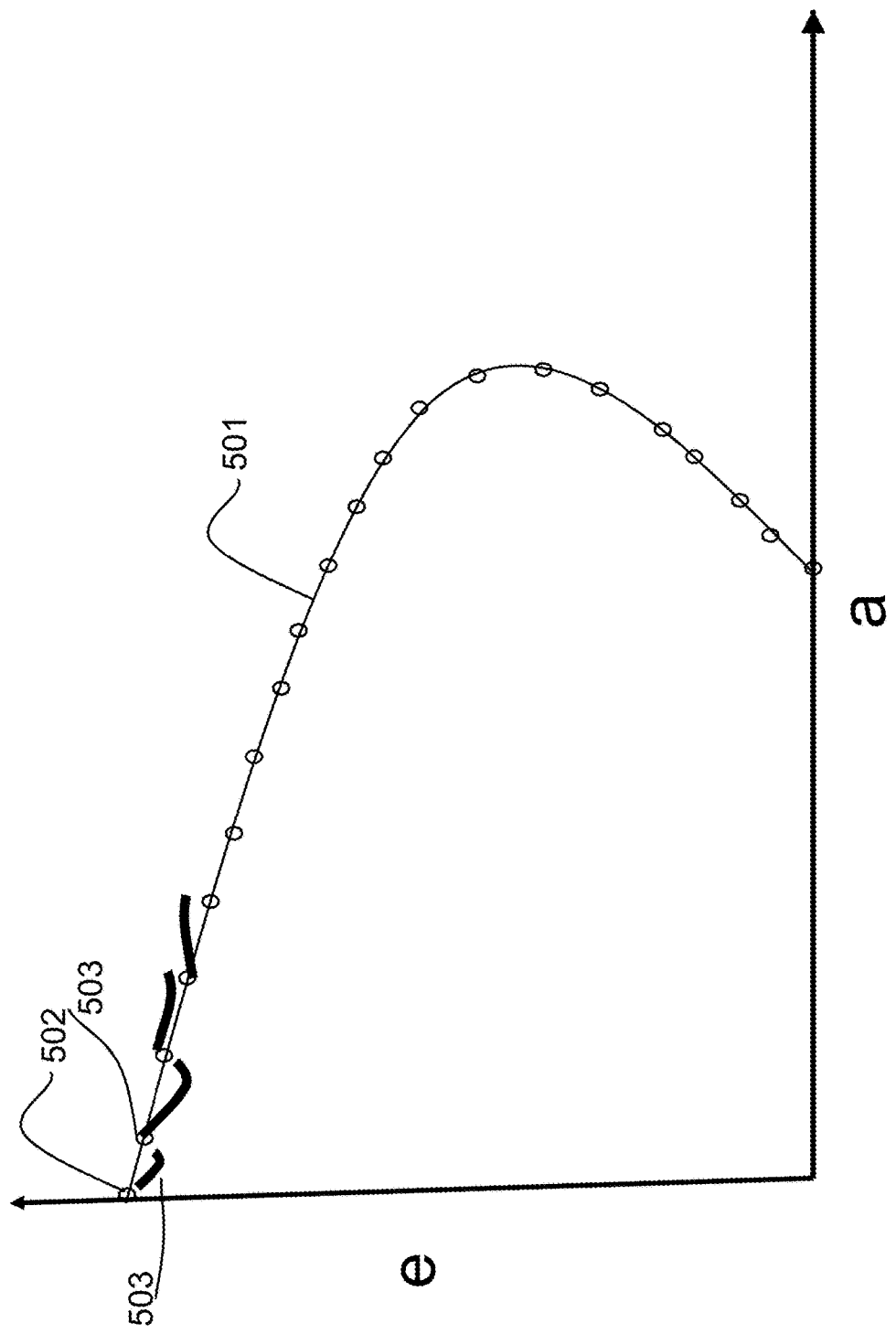
FIG. 5 shows the step 1 to obtain initial guesses from analytical solution performed in the offline spacecraft trajectory system of FIG. 3B, according to embodiments of the present invention.

FIG. 5 shows an example illustrating the process in step 1 in more detail. A good initial guess for numerically computing an osculating solution to planar minimum energy problem can be obtained by splitting an averaged trajectory 501 into N segments one orbit long (exemplary indicated as 502-503), labeled as $(p_i, e_i)_{i=1}^N$ and solving a series of smaller optimal control problems where the initial condition 502 of each segment is the ith point on the averaged trajectory 501, and a cost function defined in the following equation measures the difference between end-point of the computed segment, and (i+1)th point 503 on the averaged trajectory 501.

The cost function for ith segment is:

$$J_i = \frac{(p(L_{f,i}) - p_{i+1})^2}{(1+p_{i+1})^2} + \frac{e_x(L_{f,i})^2 + e_y(L_{f,i})^2 - e_{i+1}^2}{(1+e_{i+1}^2)^2},$$

where $L_{f,i}=(i+1)2\pi$.

The optimal control problem has initial condition $p=a_i$, $e_x=e_i$, $e_y=0$, $h_x=\tan(i_{GTO}/2)$, $h_y=0$. The thrust of a satellite is constrained to be equal to or below the maximum allowable thrust. Each of the optimal control problem cab be solved using for example GPOPS-II software.

In step 2 (404), the initial guess obtained by combining the solutions of all the segments is used solve for minimum energy 2D osculating minimum energy trajectory 405.

Some embodiments are based on recognition that 2D osculating trajectories with linearly decreasing inclination provide good initial guess for finding 3D osculating minimum energy trajectories. In Step 3 406, this guess is used to solve for 3D osculating minimum energy trajectory 407.

Some embodiments are based on recognition that a good initial guess for 3D osculating minimum fuel trajectory can be obtained by performing a homotopy operation, beginning with the 3D osculating minimum energy trajectory, and solving another series of optimal control problems with changing cost functions.

By gradually changing the homotopy parameter $\alpha$ from 1 to 0 in the cost function, each successive optimal control problem yields a trajectory that is closer to minimum fuel trajectory than the previous one. The cost function used for successive iterations is:

$$J=\int_0^T |u(t)|(\alpha|u(t)|+(1-\alpha))dt$$

Figure 6:
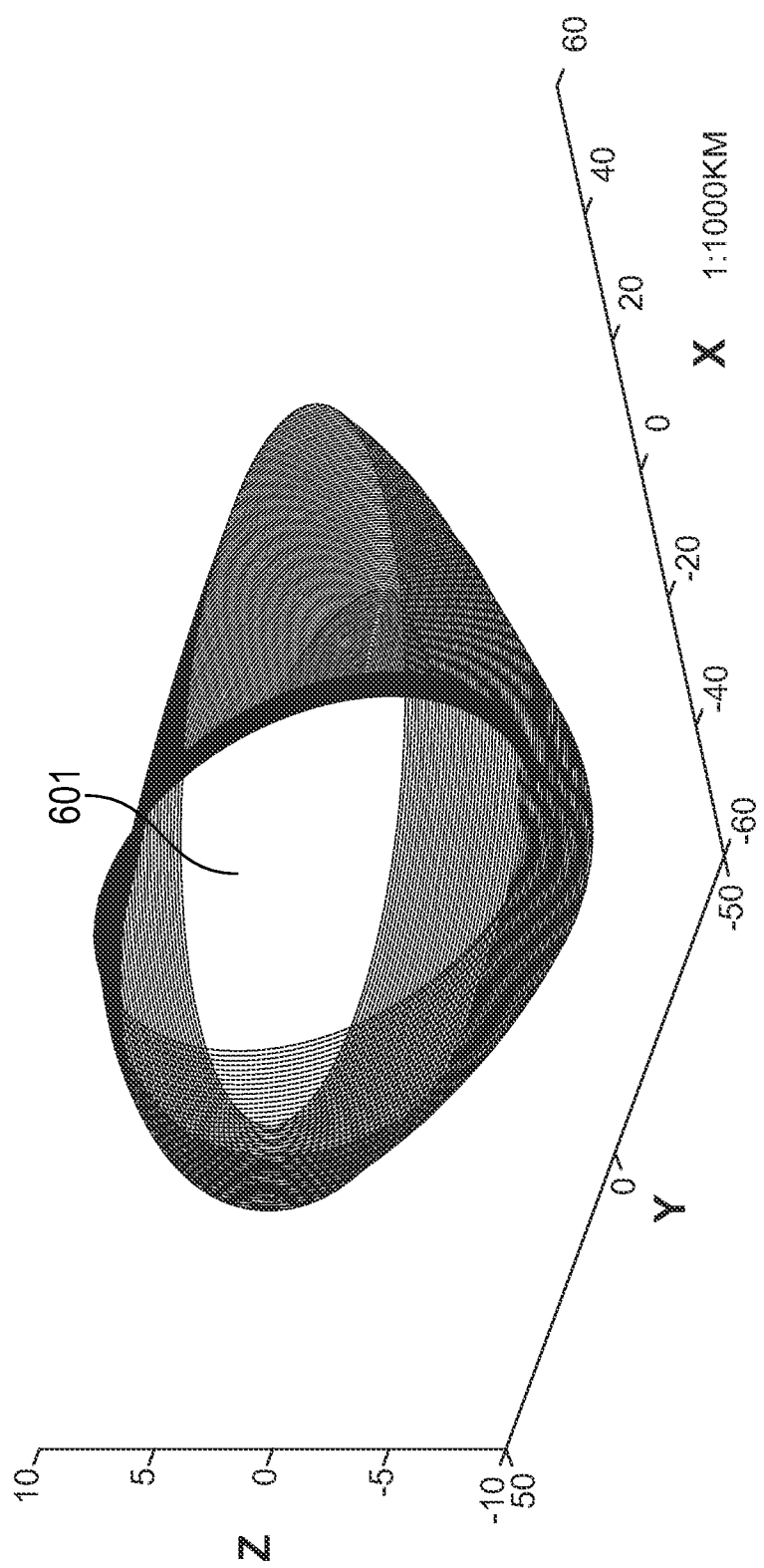
FIG. 6 shows the final minimum fuel trajectory obtained from algorithm performed in the offline spacecraft trajectory system of FIG. 3B, according to embodiments of the present invention.
Figure 7:
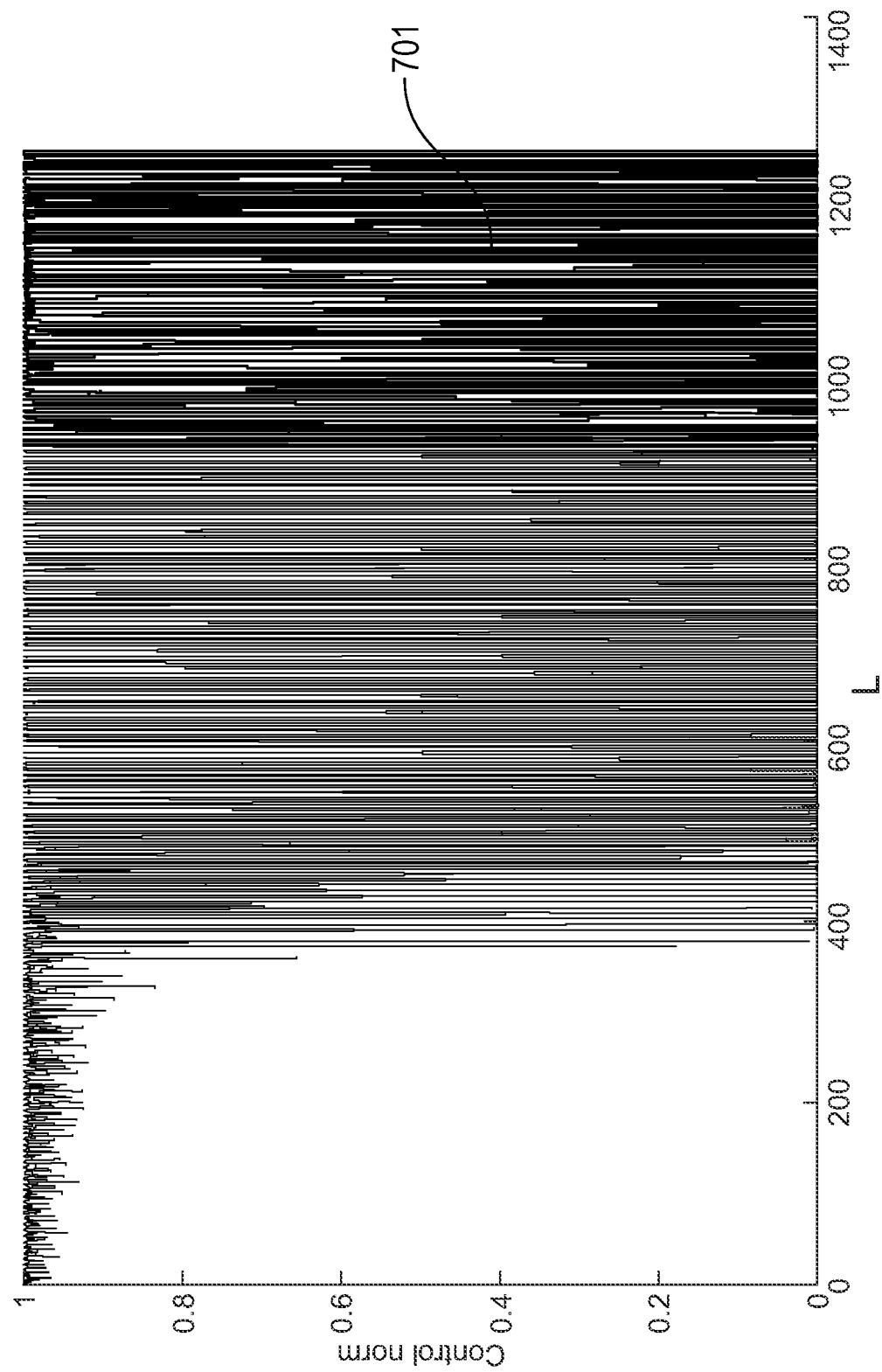
FIG. 7 shows the control profile for the minimum fuel trajectory performed in the offline spacecraft trajectory system of FIG. 3B, according to embodiments of the present invention.
Figure 8:
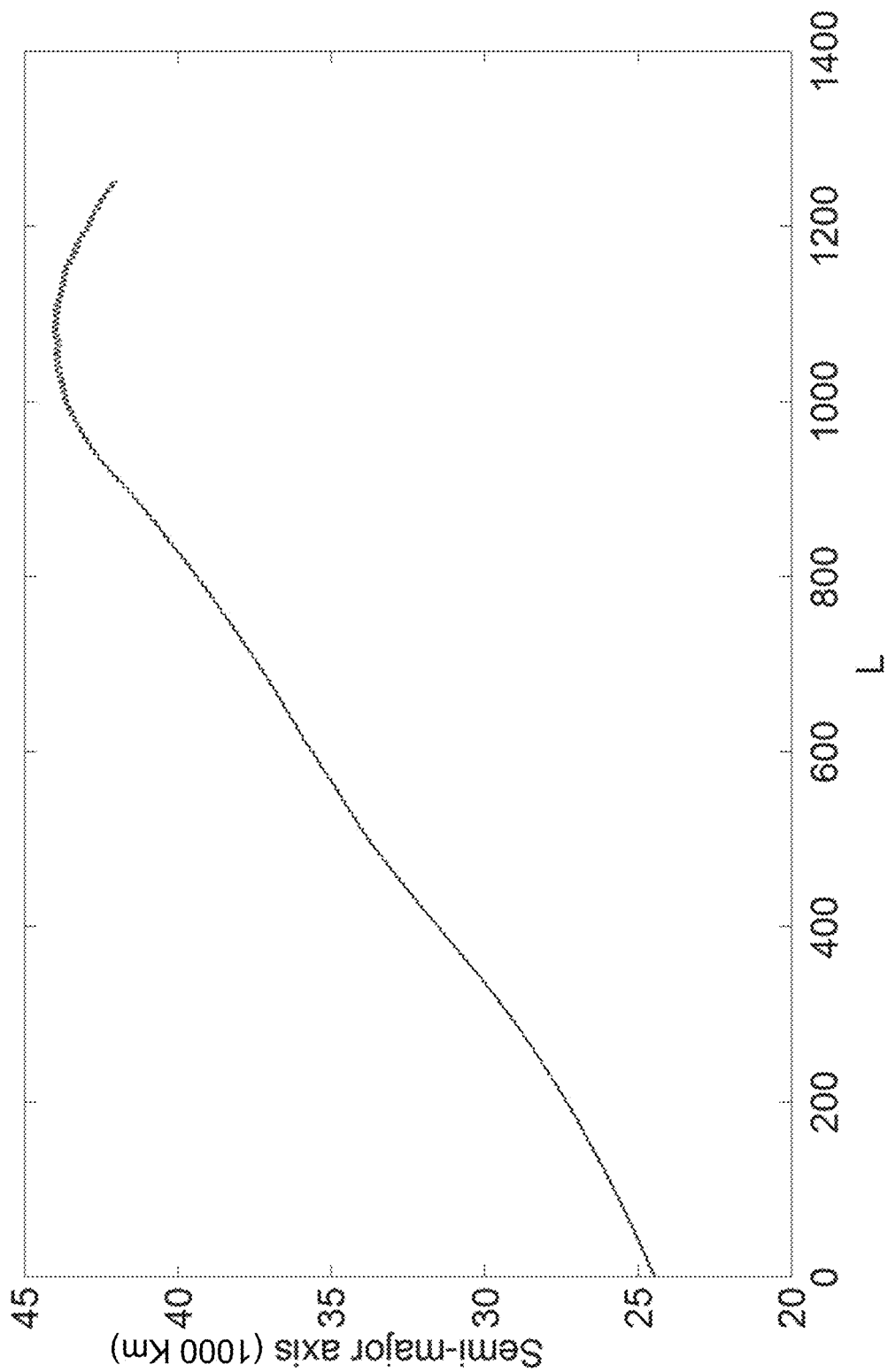
FIG. 8 shows an example indicating the semi-major axis Vs longitude plot for minimum fuel trajectory, according to embodiments of the present invention.
Figure 9:
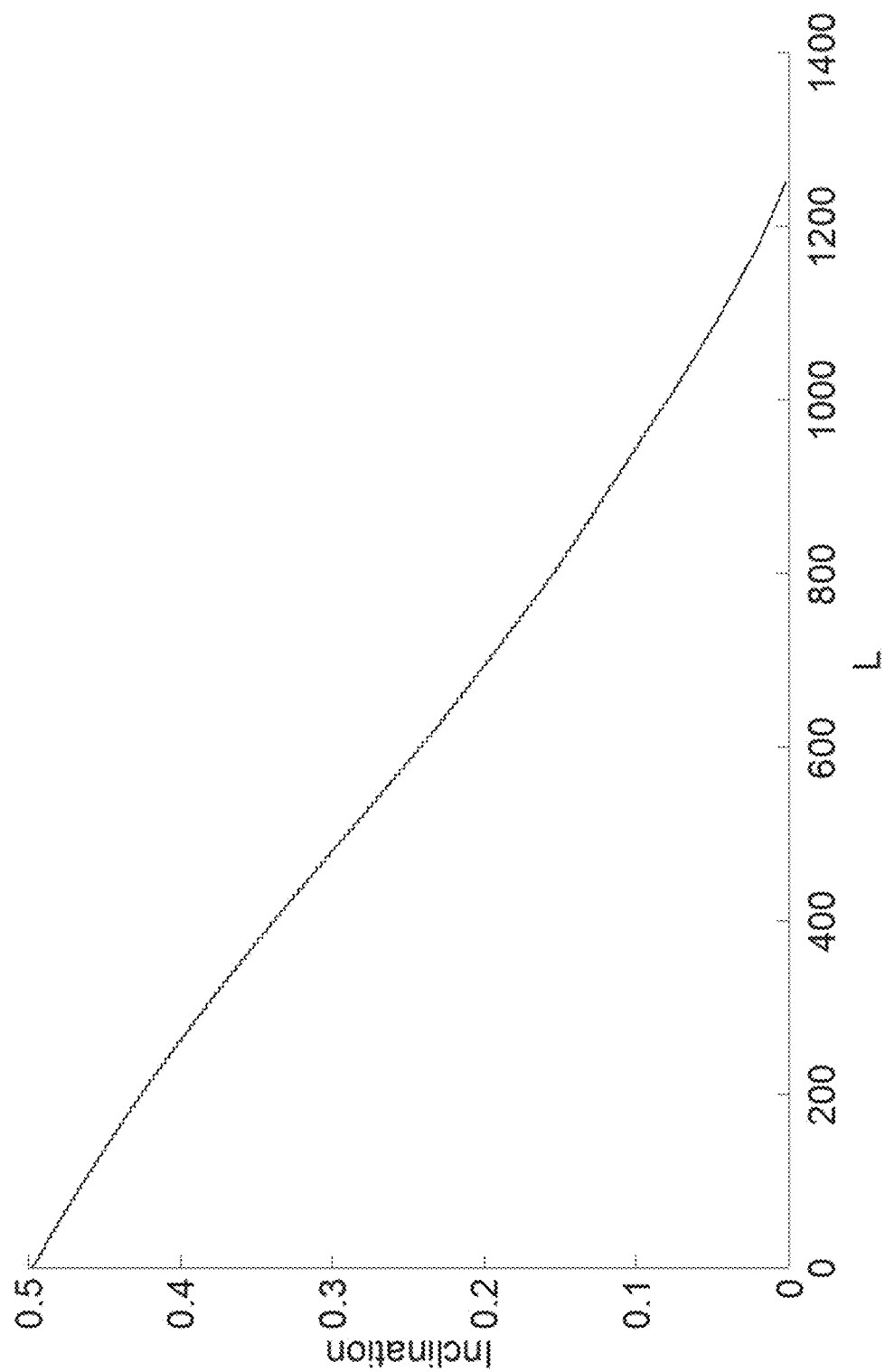
FIG. 9 shows an example indicating the inclination Vs longitude plot for minimum fuel trajectory, according to embodiments of the present invention.
Figure 10:
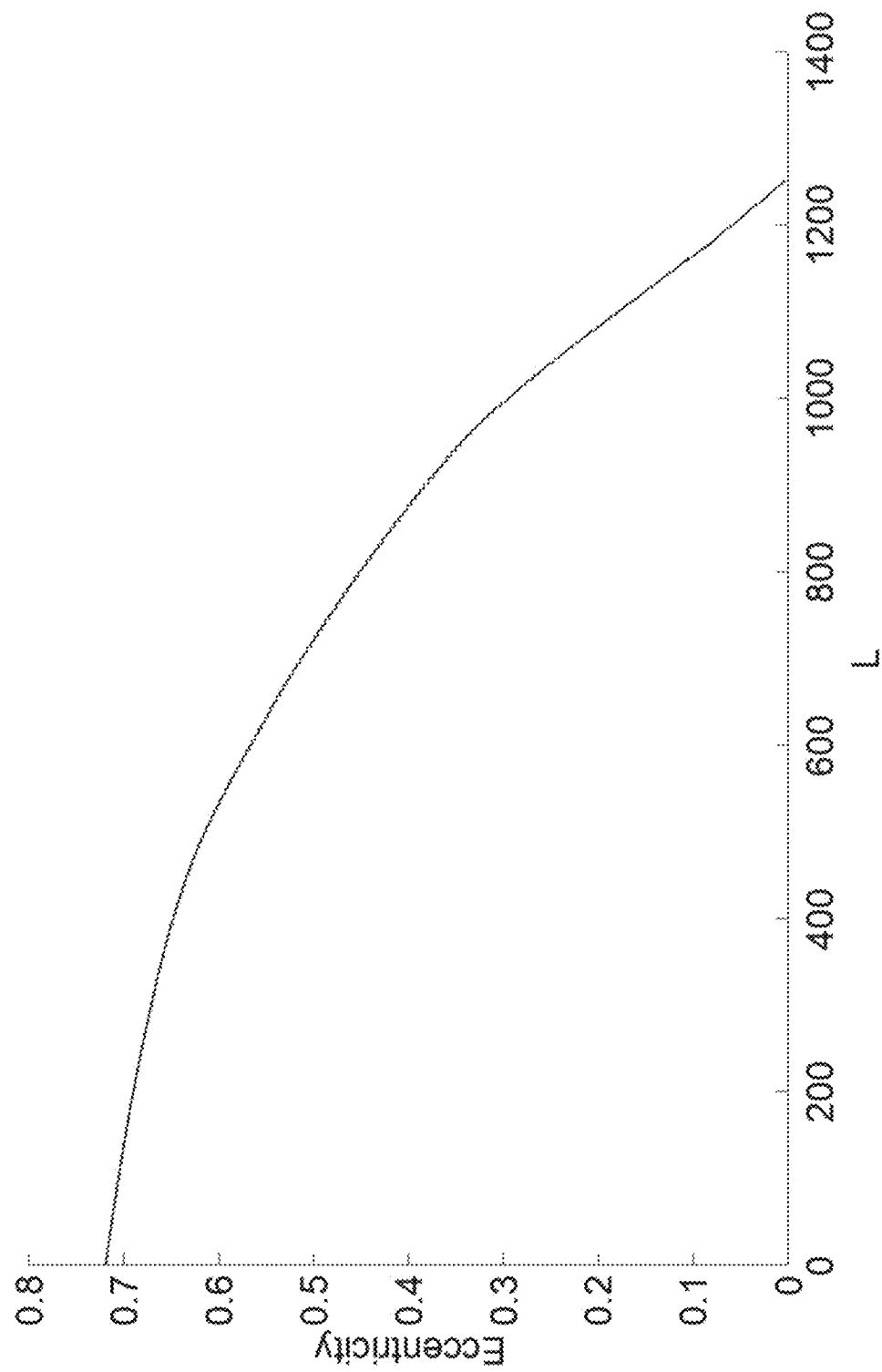
FIG. 10 shows an example indicating the eccentricity Vs longitude plot for minimum fuel trajectory, according to embodiments of the present invention.

By implementing this homotopy, step 4 (408) yields the 3D osculating minimum fuel trajectory 409. The final minimum fuel trajectory in X-Y-Z coordinates is shown in FIG. 6. The almost on-off control profile (as expected from theory) is shown in FIG. 7. FIG. 8 shows the semi-major axis Vs longitude plot for minimum fuel trajectory. FIG. 9 shows the inclination Vs longitude plot for minimum fuel trajectory. FIG. 10 shows the eccentricity Vs longitude plot for minimum fuel trajectory.

Some embodiments are based on the realization that the value of thrust vector at any instance of time, a unique spacecraft orientation matrix can be obtained by constraining the solar-panel axis to be aligned to be perpendicular to the vector pointing from spacecraft to the sun. Hence, in real time, the thruster orientation should be $R_d=[r_1 r_2 r_1^\times r_2]$, where $r_1$ is the thrusting direction obtained from fuel-optimal trajectory generated offline, $r_2$ is the (unit vector) obtained by projecting the vector from spacecraft to the sun on the plane perpendicular to $r_1$. The third component of orientation matrix is the cross product of the first two.

Further, according to some embodiments, the real-time tracking of the optimal control trajectories computed offline can be done by tracking the unique prescribed time-varying spacecraft orientation matrix.

For instance, the attitude dynamics of the spacecraft can be written as $$\dot{R}=R\omega^\times,$$

$$J\dot{\omega}=-\omega^\times(J\omega+J_\alpha v)-J_\alpha u_\alpha,$$

$$\dot{v}=u_\alpha,$$

where R is the spacecraft rotation matrix, J is moment of inertia in body frame, and $\omega$ is the angular velocity, $J_\alpha$ is the moment of inertia of reaction wheels.

An attitude controller that rejects disturbances and ensures close tracking by actuating the reaction wheels on the spacecraft can be constructed by using a Lyapunov function.

The designed control input is $$u_\alpha = J_\alpha^{-1}(v_1+v_2),$$

where $$v_1=-(J\omega+J_\alpha v)-J(K_1\dot{S}+\tilde{\omega}^\times\omega - R^T\dot{\omega}_d),$$

$$v_2=-K_v(\tilde{\omega}+K_1 S)-K_p S.$$

The first term $v_1$ ensures close tracking of the desired trajectory. The term S is an error term, given by $$S = \sum_{i=1}^{3} a_i(\tilde{R}^T e_i) \times e_i$$

where the weights $a_i$ are chosen during control design, $\tilde{R}=R_d^T R$, and $e_i$ is the ith unit vector.

The second term $v_2$ controls the speed of convergence of the controller to desired trajectory. Here, $$\dot{S} = \sum_{i=1}^{3} a_i((\tilde{R}^T e_i) \times \tilde{\omega}) \times e_i,$$

where $$\tilde{\omega}=\omega-\omega_d$$

is the error between actual and desired angular velocity, computed numerically.

Figure 11:
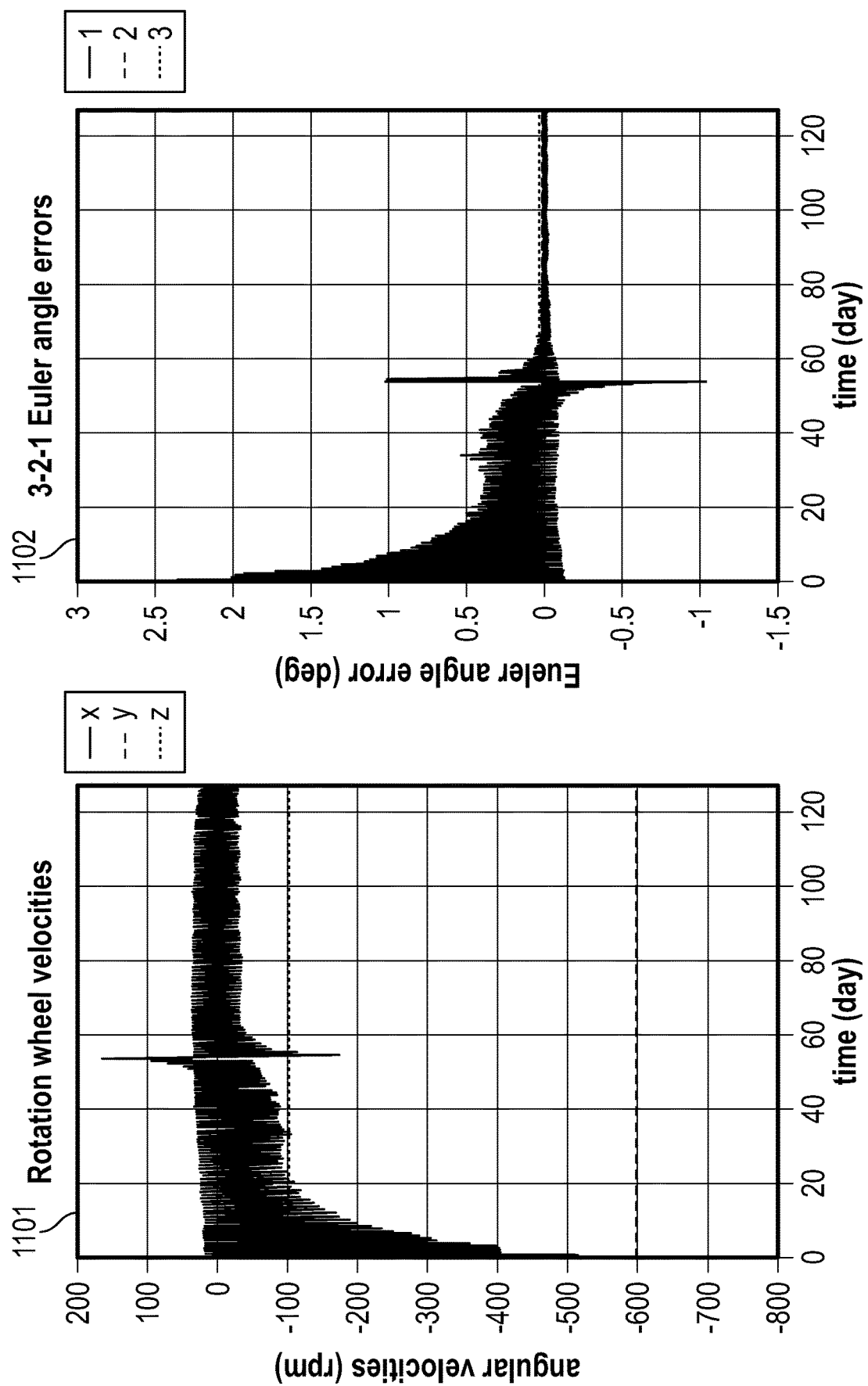
FIG. 11 shows examples indicating the relations between rotation wheel velocities and Euler angle errors during a tracking simulation, according to embodiments of the present invention.
Figure 12:
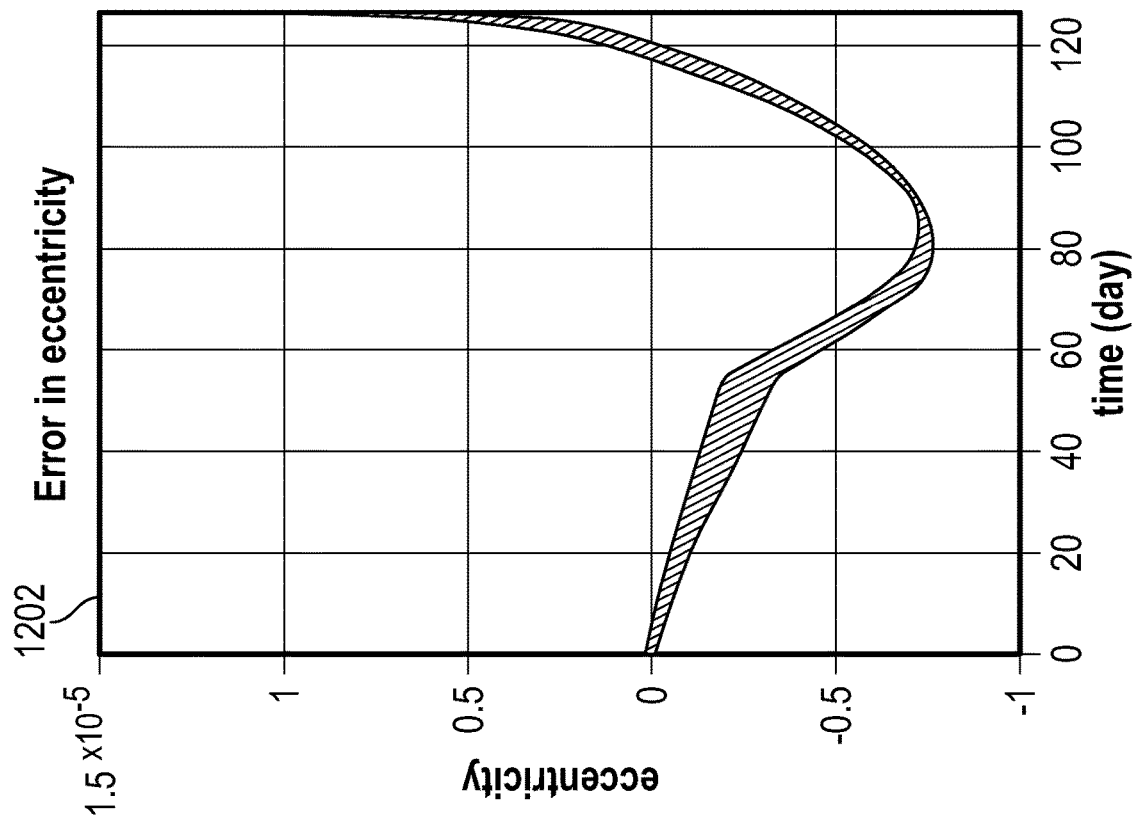
FIG. 12 shows examples indicating the relations between errors in semi-major axis and eccentricity during a tracking simulation, according to embodiments of the present invention.
Figure 12:
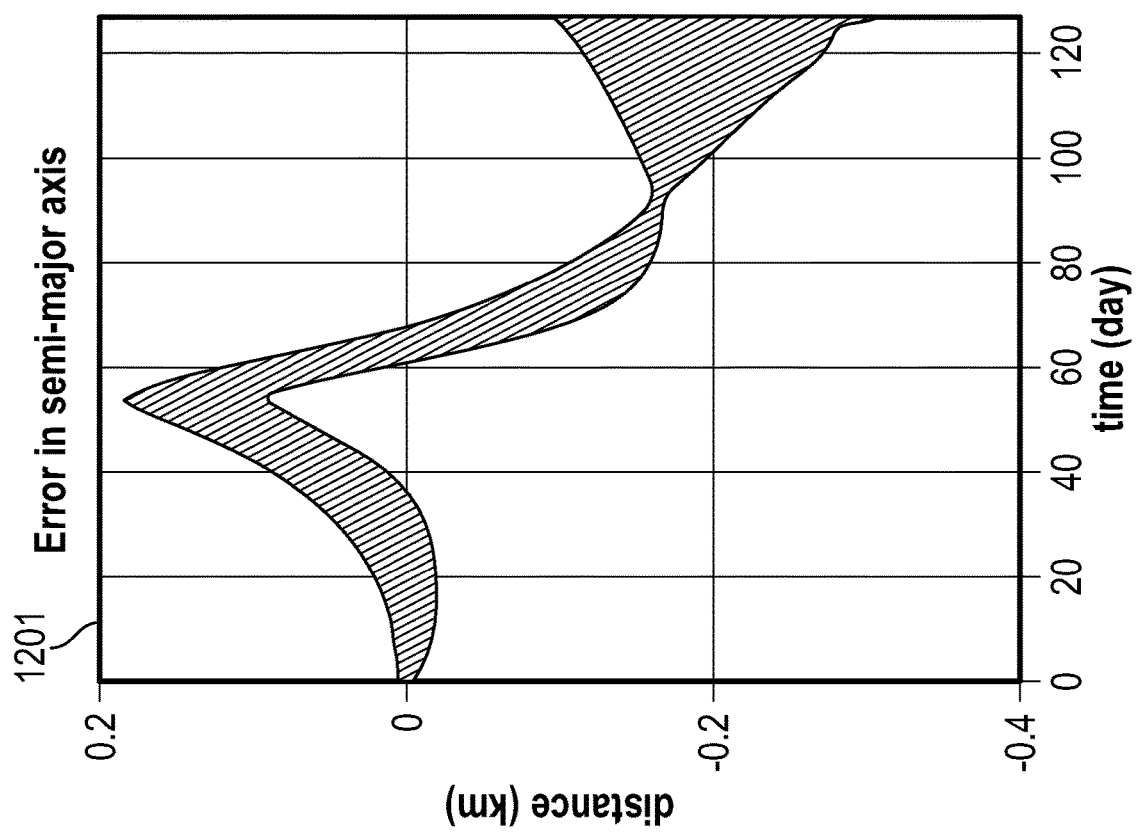
Figure 13:
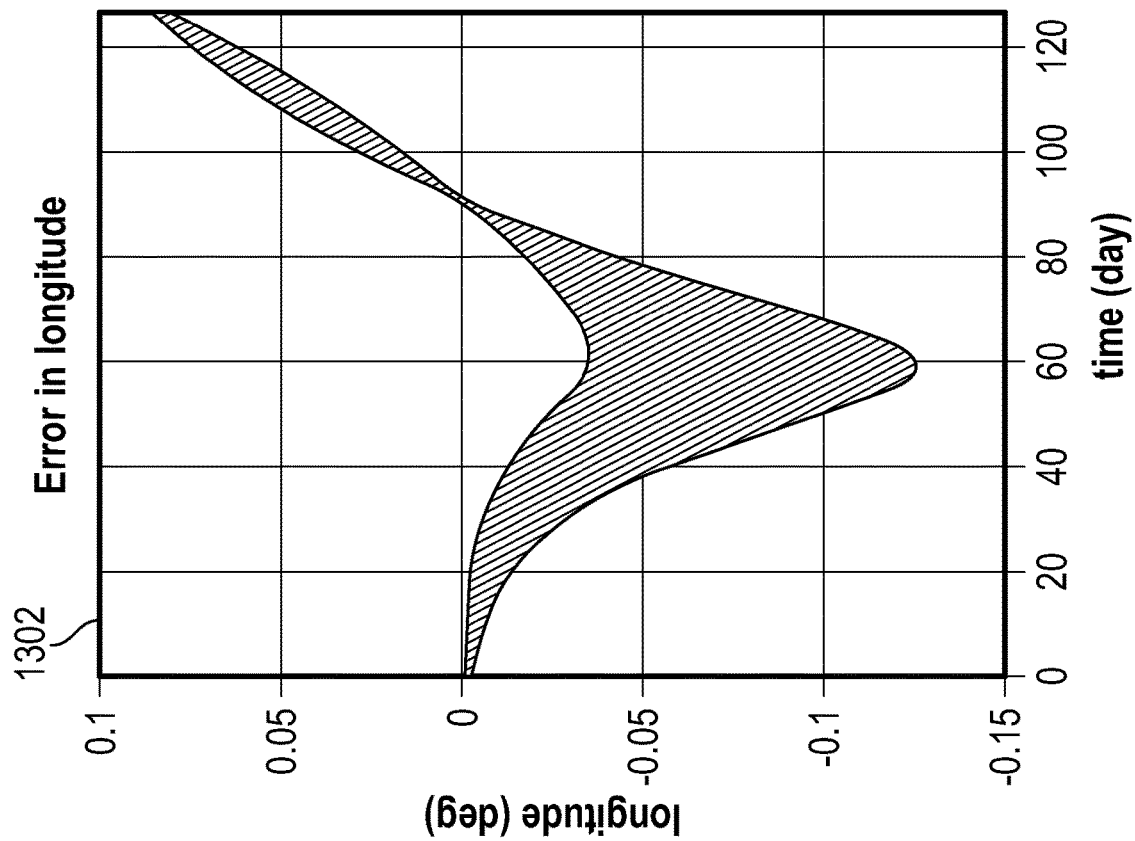
FIG. 13 shows examples indicating the relations between errors in inclination and longitude during a tracking simulation, according to embodiments of the present invention.
Figure 13:
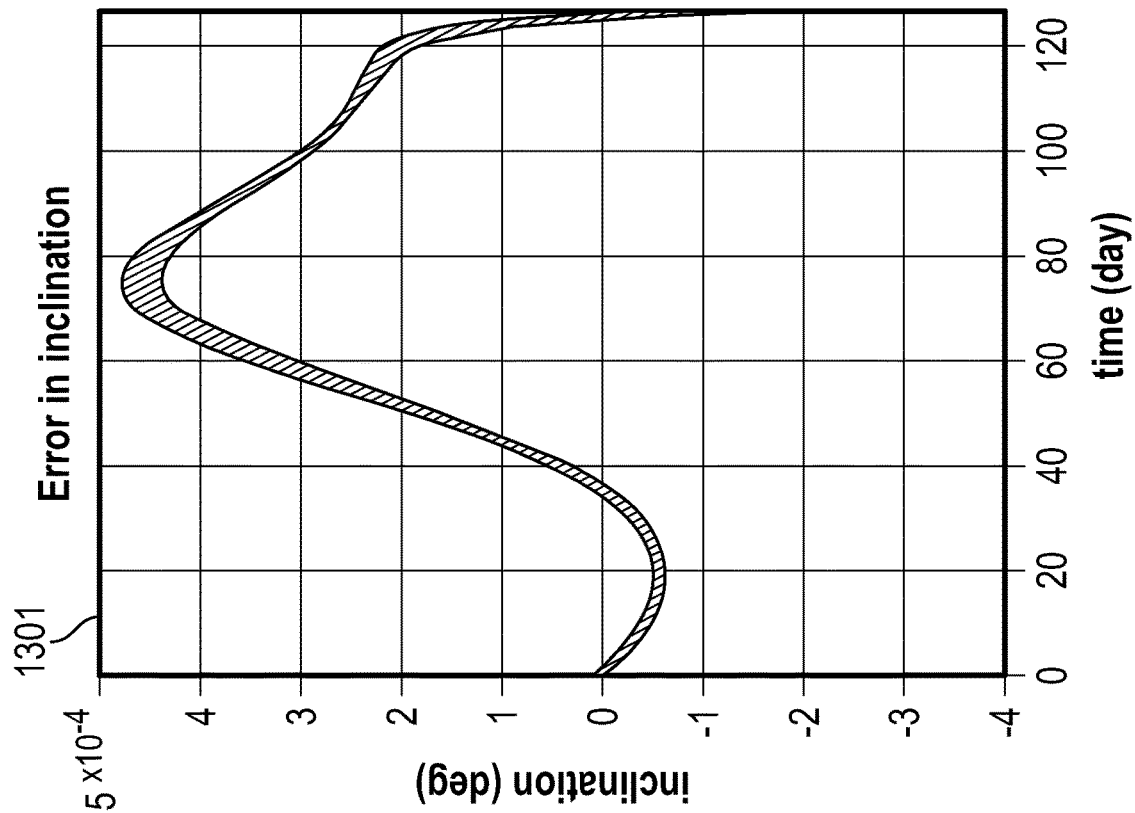

FIG. 11 shows the reaction wheel velocities 1101, and tracking errors in Euler angle of the rotation matrix in a simulated scenario. FIG. 12 shows errors in tracking semi-major axis 1201 and eccentricity 1202. FIG. 13 shows tracking errors in inclination 1301 and longitude 1302. It is seen that the controller performs very well, and all the tracking errors are very small.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for optimizing a low-thrust trajectory of a spacecraft trajectory for orbital transfer, comprising:
   an interface to receive trajectory data of a spacecraft associated with the spacecraft trajectory via a network;

a memory to store scheduled geostationary transfer orbit (GTO) data and scheduled geostationary Earth orbit (GEO) data and computer-executable programs; and a processor, in connection with the memory, is programmed to:

provide a two-dimensional (2D) averaged trajectory, based on the trajectory data, using the scheduled GTO data and scheduled GEO data, wherein the 2D averaged trajectory includes predetermined orbits;

arrange N equidistant points on the 2D averaged trajectory to form segments on the 2D averaged trajectory;

obtain osculating elements corresponding to the segments by solving optimization problems for the segments, wherein each of the optimization problems is solved by minimizing a distance between an end-point of a current segment and a next point of a next segment on the 2D averaged trajectory;

estimate initial guesses of the segments under continuous thrusting conditions in tangential directions at the N equidistant points based on the obtained osculating elements;

solve for a minimum energy 2D osculating trajectory by applying the initial guesses to the segments;

compute a minimum energy three-dimensional (3D) osculating trajectory by starting with a trajectory obtained by linearly decreasing the inclination of the minimum energy 2D osculating trajectory from that GTO to zero;

generate a minimum fuel 3D osculating trajectory based on the minimum energy 3D osculating trajectory and iterative execution of a cost function while changing a parameter from one to zero; and control reaction wheels and propulsion thrusters of the spacecraft by transmitting data of the generated minimum fuel 3D osculating trajectory to an attitude controller of the spacecraft such that the attitude controller causes the reaction wheels and propulsion thrusters to produce thrust of the spacecraft along the generated minimum fuel 3D osculating trajectory by using the transmitted data of the generated minimum fuel 3D osculating trajectory.

2. The system of claim 1, wherein the N equidistant points are arranged to divide the revolutions by $2\pi$ radian.

3. The system of claim 1, wherein the parameter is a homotopy parameter $\alpha$ of a function represented by $$J=\int_0^T |u(t)|(\alpha|u(t)|+(1-\alpha))dt$$

wherein J, T and u(t) are the cost function, total time of mission and control input, wherein the control input is calculated based on at least a moment of inertia of the reaction wheels of the spacecraft, wherein by changing the homotopy parameter $\alpha$ from one to zero in the cost function, each successive optimal control problem yields a trajectory that is closer to the minimum fuel 3D osculating trajectory than the previous one.

4. The system of claim 1, wherein the trajectory data include measured trajectory data of the spacecraft from an online satellite operation control system via the network.

5. A method for optimizing a low-thrust trajectory of a spacecraft trajectory for orbital transfer, comprising:

receiving trajectory data of a spacecraft associated with the spacecraft trajectory;

storing scheduled geostationary transfer orbit (GTO) data and scheduled geostationary Earth orbit (GEO) data in a memory;

providing a two-dimensional (2D) averaged trajectory, based on the trajectory data, using the scheduled GTO and the scheduled GEO data, wherein the 2D averaged trajectory includes predetermined orbits;

arranging N equidistant points on the 2D averaged trajectory to form segments on the 2D averaged trajectory;

obtaining osculating elements corresponding to the segments by solving optimization problems for the segments, wherein each of the optimization problems is solved by minimizing a distance between an end-point of a current segment and a next point of a next segment on the 2D averaged trajectory;

estimating initial guesses of the segments under continuous thrusting conditions in tangential directions at the N equidistant points based on the obtained osculating elements;

solving for a minimum energy 2D osculating trajectory by applying the initial guesses to the segments;

computing a minimum energy three-dimensional (3D) osculating trajectory by starting with a trajectory obtained by linearly decreasing the inclination of the minimum energy 2D osculating trajectory from that GTO to zero;

generating a minimum fuel 3D osculating trajectory based on the minimum energy 3D osculating trajectory and iterative execution of a cost function while changing a parameter from one to zero; and controlling reaction wheels and propulsion thrusters of the spacecraft by transmitting data of the generated minimum fuel 3D osculating trajectory to an attitude controller of the spacecraft such that the attitude controller causes the reaction wheels and propulsion thrusters to produce thrust of the spacecraft along the generated minimum fuel 3D osculating trajectory by using the transmitted data of the generated minimum fuel 3D osculating trajectory.

6. The method of claim 5, wherein the N equidistant points are arranged to divide the revolutions by $2\pi$ radian.

7. The method of claim 5, wherein the parameter is a homotopy parameter $\pi$ of a function represented by $$J=\int_0^T |u(t)|(\alpha|u(t)|+(1-\alpha))dt$$

wherein J, T and u(t) are the cost function, total time of mission and control input, wherein the control input is calculated based on at least a moment of inertia of the reaction wheels of the spacecraft, wherein by changing the homotopy parameter $\alpha$ from one to zero in the cost function, each successive optimal control problem yields a trajectory that is closer to the minimum fuel 3D osculating trajectory than the previous one.

8. The method of claim 5, wherein the trajectory data include measured trajectory data of the spacecraft from an online satellite operation control system via the network.

* * * * *